US011859367B2

(12) United States Patent
Saitoh et al.

(10) Patent No.: US 11,859,367 B2
(45) Date of Patent: Jan. 2, 2024

(54) CONSTRUCTION MACHINE

(71) Applicant: Hitachi Construction Machinery Co., Ltd., Tokyo (JP)

(72) Inventors: Teppei Saitoh, Mito (JP); Hiromasa Takahashi, Abiko (JP); Kenji Hiraku, Kasumigaura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 506 days.

(21) Appl. No.: 17/275,064

(22) PCT Filed: Nov. 5, 2019

(86) PCT No.: PCT/JP2019/043331
§ 371 (c)(1),
(2) Date: Mar. 10, 2021

(87) PCT Pub. No.: WO2020/152937
PCT Pub. Date: Jul. 30, 2020

(65) Prior Publication Data

US 2022/0056667 A1 Feb. 24, 2022

(30) Foreign Application Priority Data

Jan. 25, 2019 (JP) ................................ 2019-011592

(51) Int. Cl.
*E02F 9/22* (2006.01)
*F15B 11/17* (2006.01)
(Continued)

(52) U.S. Cl.
CPC ................ *E02F 9/123* (2013.01); *E02F 3/32* (2013.01); *E02F 9/2289* (2013.01); (Continued)

(58) Field of Classification Search
CPC ....... E02F 9/123; E02F 9/2289; E02F 9/2296; E02F 9/2292; F15B 11/17; F15B 2211/7135; F16H 61/4104
See application file for complete search history.

(56) References Cited

U.S. PATENT DOCUMENTS 4,369,625 A * 1/1983 Izumi .................... E02F 9/2242 414/699
10,415,215 B2 * 9/2019 Takahashi ............. E02F 9/2235
(Continued)

FOREIGN PATENT DOCUMENTS

EP 3 369 867 A1 9/2018
JP 58-144104 U 9/1983
(Continued)

OTHER PUBLICATIONS

Extended European Search Report issued in European Application No. 19911321.8 dated Mar. 24, 2022 (nine (9) pages).
(Continued)

*Primary Examiner* — Michael Leslie
(74) *Attorney, Agent, or Firm* — Crowell & Moring LLP

(57) ABSTRACT

Provided is a construction machine on which a hydraulic closed circuit for driving a single rod-type hydraulic cylinder and a swing hydraulic motor is mounted and that has good swing deceleration responsiveness. In this construction machine that drives each of a single rod-type hydraulic cylinder and a swing hydraulic motor in a closed circuit, a minimum passage area from a second flushing valve to a tank in a case the second flushing valve is fully open is smaller than a minimum passage area from a first flushing valve to the tank in a case the first flushing valve is fully open.

4 Claims, 8 Drawing Sheets

(51) Int. Cl.
*E02F 9/12* (2006.01)
*E02F 3/32* (2006.01)

(52) U.S. Cl.
CPC .......... *E02F 9/2292* (2013.01); *E02F 9/2296* (2013.01); *F15B 11/17* (2013.01); *F15B 2211/7135* (2013.01)

(56) References Cited

U.S. PATENT DOCUMENTS

| | | | | |
|---|---|---|---|---|
| 10,655,740 B2 * | 5/2020 | Shimizu | .................. | F15B 11/08 |
| 10,914,053 B2 * | 2/2021 | Kai | ......................... | F15B 11/02 |
| 10,947,699 B2 * | 3/2021 | Saitoh | ................... | F15B 20/008 |
| 11,118,328 B2 * | 9/2021 | Shimizu | ................ | E02F 9/2285 |
| 11,319,693 B2 * | 5/2022 | Takahashi | ............. | E02F 9/2012 |
| 11,499,296 B2 * | 11/2022 | Kai | ..................... | F15B 13/0416 |
| 2019/0345692 A1 | 11/2019 | Saitoh et al. | | |

FOREIGN PATENT DOCUMENTS

| | | |
|---|---|---|
| JP | 59-208205 A | 11/1984 |
| JP | 2016-17602 A | 2/2016 |
| WO | WO 2018/179863 A1 | 10/2018 |

OTHER PUBLICATIONS

International Search Report (PCT/ISA/210) issued in PCT Application No. PCT/JP2019/043331 dated Jan. 7, 2020 with English translation (three (3) pages).

Japanese-language Written Opinion (PCT/ISA/237) issued in PCT Application No. PCT/JP2019/043331 dated Jan. 7, 2020 (three (3) pages).

International Preliminary Report on Patentability (PCT/IB/338 & PCT/IB/373) issued in PCT Application No. PCT/JP2019/043331 dated Aug. 5, 2021, including Japanese-language Written Opinion (PCT/ISA/237) with English translation (five (5) pages).

* cited by examiner

CONSTRUCTION MACHINE

TECHNICAL FIELD

The present invention relates to a construction machine such as a hydraulic excavator, particularly to a construction machine that drives a single rod-type hydraulic cylinder and a swing hydraulic motor in a hydraulic closed circuit.

BACKGROUND ART

In recent years, in construction machines such as a hydraulic excavator and a wheel loader, energy conservation has been an important element of development. For energy conservation of a construction machine, energy conservation of a hydraulic system itself is important; there has been investigated a hydraulic closed circuit (hereinafter referred to as a closed circuit) in which a hydraulic pump and a hydraulic actuator are connected in a state of a closed circuit, and the speed of the hydraulic actuator is controlled directly by flow rate control of the hydraulic pump. This system involves no pressure loss due to a conventional flow control valve, and in this system, energy loss is little because the pump delivers only the required flow rate. In addition, the potential energy of the hydraulic actuator and the kinetic energy at the time of deceleration can also be regenerated. Therefore, further energy conservation is possible.

As a disclosure of conventional technology of a construction machine on which a closed circuit is mounted, there is Patent Document 1. Patent Document 1 describes a configuration in which a hydraulic pump is connected to actuators (a boom cylinder, a swing motor, etc.) in a closed circuit and the operation speed of each of the actuators is controlled by swash plate control of the hydraulic pump.

The closed circuit described in Patent Document 1 is provided with a flushing valve. The flushing valve is a valve for permitting a line on a low pressure side of the closed circuit to communicate with the tank, for keeping balance of the hydraulic operating oil in the closed circuit, and has a function of discharging the surplus oil on the low pressure side to the tank.

In Patent Document 1, in the case of contracting a boom cylinder, the pump sucks in the hydraulic operating oil from the head side of the boom cylinder, and delivers the oil to the rod side. In this instance, the flushing valve is switched over so as to connect the rod side of the boom cylinder which is the low pressure side to the tank. As a result, while the hydraulic operating oil delivered by the pump flows into the rod side of the boom cylinder, the hydraulic operating oil corresponding to the pressure receiving area difference of the boom cylinder which is a single rod cylinder is discharged from the flushing valve to the tank.

On the other hand, in the case of accelerating the swing structure, the pump sucks in the hydraulic operating oil from the input/output side on one side of a swing motor, and delivers the oil to the input/output side on the other side. At this time, the flushing valve is switched over so as to connect the pump suction side which is the low pressure side to the tank. Here, when the delivery rate of the pump is reduced to decelerate the swing structure, the swing motor continues delivering the hydraulic operating oil due to the inertial energy of the swing structure, and, therefore, the pump suction side becomes a high pressure, and the flushing valve is switched over so as to connect the pump delivery side which is the low pressure side of the closed circuit to the tank. As a result, a braking pressure is exerted on the swing motor, and the swing structure is decelerated.

PRIOR ART DOCUMENT

Patent Document

Patent Document 1: JP-2016-017602-A

SUMMARY OF THE INVENTION

Problem to be Solved by the Invention

In the case of a general single rod cylinder, the pressure receiving area ratio between the head side and the rod side is approximately 2:1, and, therefore, in a closed circuit driving a single rod cylinder (hereinafter referred to as a cylinder closed circuit), approximately one half of the hydraulic operating oil delivered by the pump is discharged from the flushing valve to the tank. Therefore, in the cylinder closed circuit, for reducing the pressure loss at the flushing valve, it is necessary to enlarge the size of the flushing valve.

On the other hand, since a swing motor does not have such a pressure receiving area difference as that of the single rod cylinder, in the closed circuit driving the swing motor (hereinafter referred to as a swing closed circuit), the flow rate discharged from the flushing valve to the tank is as small as equal to or less than 1/10 times that of the cylinder closed circuit. Here, when the flushing valve of the same shape is used in the cylinder closed circuit and the swing closed circuit from the viewpoint of cost or the like, the pressure loss in the flushing valve in the swing closed circuit is smaller, so that the rise of pressure on the pump suction side (low pressure side) at the time of starting swing deceleration is delayed. As a result, the timing of switching-over of the flushing valve is delayed, and it takes time for the pressure on the pump suction side to reach the relief pressure (brake pressure). As a result, swing deceleration responsiveness is lowered, and operability is worsened.

The present invention has been made in consideration of the above-mentioned problems. It is an object of the present invention to provide a construction machine on which a hydraulic closed circuit for driving a single rod-type hydraulic cylinder and a swing hydraulic motor is mounted and that has good swing deceleration responsiveness.

Means for Solving the Problem

In order to achieve the above object, the present invention provides a construction machine including: a lower track structure; an upper swing structure swingably mounted to the lower track structure; a work device provided on the upper swing structure; a tank reserving a hydraulic operating oil; a single rod-type hydraulic cylinder that drives the work device; a swing hydraulic motor that drives the upper swing structure; an operating device that gives instructions on operations of the work device and the upper swing structure; a first closed circuit pump including a bidirectionally tiltable pump; a second closed circuit pump including a bidirectionally tiltable pump; a cylinder closed circuit that connects the first closed circuit pump to the single rod-type hydraulic cylinder in a state of a closed circuit; a swing closed circuit that connects the second closed circuit pump to the swing hydraulic motor in a state of a closed circuit; a first flushing valve that permits a line on a low pressure side of the cylinder closed circuit to communicate with the tank; a second flushing valve that permits a line on a low pressure side of the swing closed circuit to communicate with the tank; a first selector valve that switches between communication and interruption of communication between the first closed circuit pump and the single rod-type hydraulic cylinder; and a second selector valve that switches between communication and interruption of communication between the second closed circuit pump and the swing hydraulic motor, and openings and closings of the first selector valve and the second selector valve and delivery rates of the first closed circuit pump and the second closed circuit pump being controlled according to operation signals inputted from the operating device, in which a minimum passage area from the second flushing valve to the tank in a case the second flushing valve is fully open is smaller than a minimum passage area from the first flushing valve to the tank in a case the first flushing valve is fully open.

According to the present invention configured as above, at the time of starting swing deceleration, when the hydraulic operating oil is discharged from the pump suction side to the tank through the swing closed circuit flushing valve (second flushing valve), a large pressure loss is generated at the second flushing valve, whereby the pressure inside the line on the pump suction side rises, and the second flushing valve is swiftly switched over. As a result, the time taken for the pressure inside the line on the pump suction side to reach the relief pressure is shortened, and, therefore, swing deceleration responsiveness is enhanced, and good swing operability is obtained.

Advantages of the Invention

According to the present invention, in a construction machine that drives a single rod-type hydraulic cylinder and a swing hydraulic motor in a hydraulic closed circuit, it is possible to enhance swing deceleration responsiveness and to obtain good swing operability.

MODES FOR CARRYING OUT THE INVENTION

A construction machine according to embodiments of the present invention will be described below referring the drawings, while taking a hydraulic excavator as an example thereof. Note that the present invention is generally applicable to construction machines that include a plurality of hydraulic closed circuits having a closed circuit pump and a hydraulic cylinder connected through a selector valve in a state of a closed circuit and that include a swing closed circuit, so that the object to which to apply the present invention is not limited to the hydraulic excavator.

First Embodiment

A hydraulic excavator according to a first embodiment of the present invention will be described.

(Machine Body Main Body)

Figure 1:
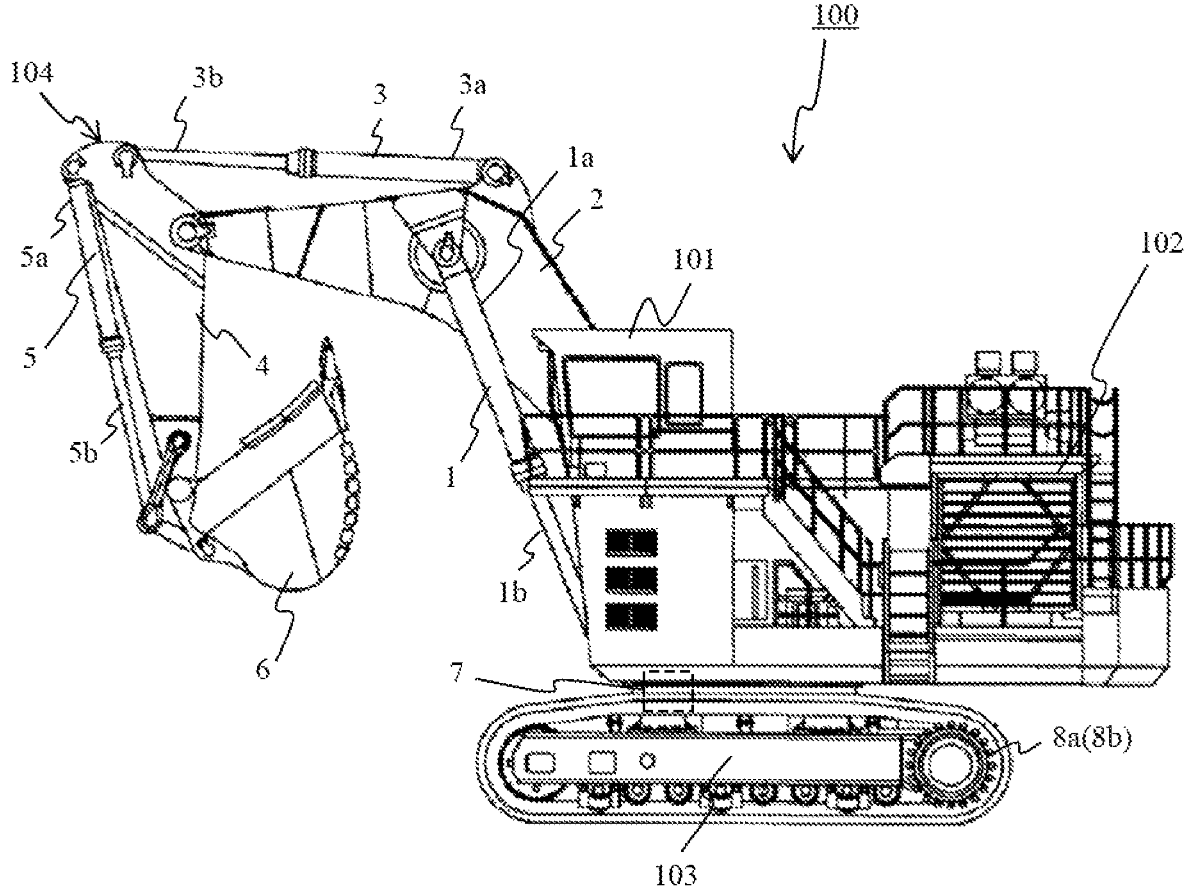
FIG. 1 is a side view depicting a hydraulic excavator according to a first embodiment of the present invention.

FIG. 1 is a side view depicting the hydraulic excavator according to the present embodiment.

In FIG. 1, a hydraulic excavator 100 includes a lower track structure 103 including crawler type track devices **8*a* and 8*b* on both side in a left-right direction, and an upper swing structure 102 swingably mounted onto the lower track structure 103. The lower track structure 103 and the upper swing structure 102 constitute a machine body main body of the hydraulic excavator 100**.

On the upper swing structure 102, a cab 101 as an operating room in which an operator is seated is provided. The lower track structure 103 and the upper swing structure 102 are swingable through a swing motor 7 as a swing hydraulic motor. To the front side of the upper swing structure 102, a base end portion of a front work implement 104 as a work device for performing, for example, excavation or the like is attached rotatably. Here, the front side refers to a direction in which the operator being seated in the cab 101 is directed (leftward direction in FIG. 1).

The front work implement 104 includes a boom 2 a base end portion of which is connected to the front side of the upper swing structure 102 in a vertically rotatable manner. The boom 2 operates through a boom cylinder 1 which is a single rod-type hydraulic cylinder. The boom cylinder 1 has a tip end portion of a boom rod **1*b* connected to the upper swing structure 102, and has a base end portion of a boom head 1*a* connected to the boom 2. To a tip end portion of the boom 2, a base end portion of an arm 4 is connected rotatably vertically or in a front-rear direction. The arm 4 operates through an arm cylinder 3 which is a single rod-type hydraulic cylinder. The arm cylinder 3 has a tip end portion of an arm rod 3*b* connected to the arm 4, and has a base end portion of the arm head 3*a* connected to the boom 2. To a tip end portion of the arm 4, a base end portion of a bucket 6 is connected rotatably vertically or in the front-rear direction. The bucket 6 operates through a bucket cylinder 5 which is a single rod-type hydraulic cylinder. The bucket cylinder 5 has a tip end portion of a bucket rod 5*b* connected to the bucket 6, and has a base end portion of a bucket head 5*a* connected to the arm 4. In the cab 101, there are disposed operating levers 30 (depicted in FIG. 2) as operating members for operating the boom 2, the arm 4, and the bucket 6 constituting the front work implement 104 and the upper swing structure 102**.

(Hydraulic Driving Device)

Figure 2:
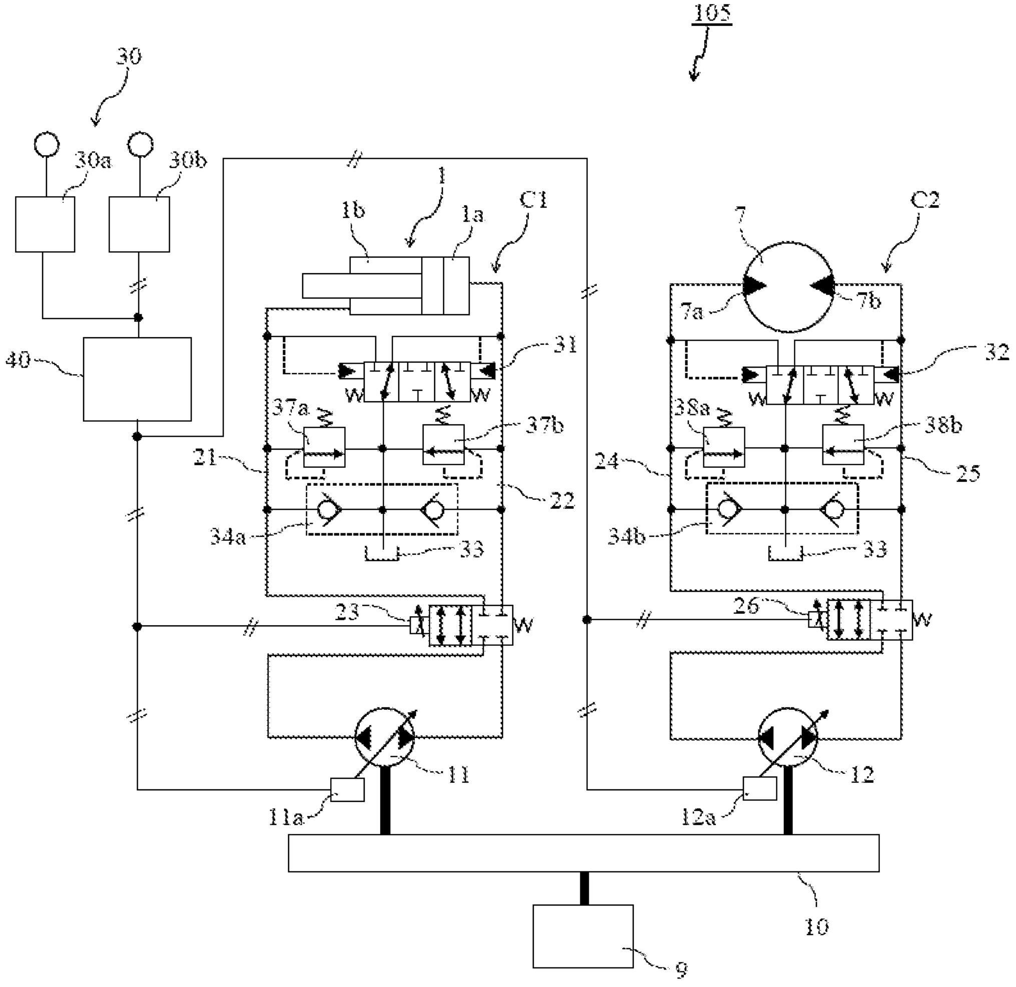
FIG. 2 is a hydraulic circuit diagram depicting a hydraulic driving device according to the first embodiment of the present invention.

FIG. 2 is a schematic view depicting a hydraulic driving device for driving the hydraulic excavator 100. Note that, in FIG. 2, only the parts concerning driving of the boom cylinder 1 and the swing motor 7 are depicted, and the parts concerning driving of the other actuators are omitted.

(Cylinders, Motor)

A hydraulic driving device 105 includes the boom cylinder 1, the swing motor 7, a closed circuit pump 11 for driving the boom cylinder 1, and a closed circuit pump 12 for driving the swing motor 7. The swing motor 7 includes a pair of input-output ports 7*a* and 7*b*.

(Pumps)

The closed circuit pumps 11 and 12 are each driven by receiving power from an engine 9 through a transmission device 10. The closed circuit pumps 11 and 12 each include tilting swash plate mechanism having a pair of input-output ports as flow rate regulating means, and include regulators 11*a* and 12*a*, respectively, for regulating the pump displacements by regulating the inclination angles of the swash plates. The regulators 11*a* and 12*a* respectively control the delivery rates and delivery directions of the closed circuit pumps 11 and 12 according to pump delivery rate command values received from a pump valve controller 40 through a control signal line.

(Closed Circuits, Selector Valves)

Delivery ports on both sides of the closed circuit pump 11 are connected to the boom cylinder 1 through lines 21 and 22 and a selector valve 23, and constitute a cylinder closed circuit C1. Delivery ports on both sides of the closed circuit pump 12 are connected to the swing motor 7 through lines 24 and 25 and a selector valve 26, and constitute a swing closed circuit C2. The selector valve 23 switches between communication and interruption of communication between the lines 21 and 22 by an opening-closing control command received from the pump valve controller 40 through a control signal line. The selector valve 26 switches between communication and interruption of communication between the lines 24 and 25 by an opening-closing control command received from the pump valve controller 40 through a control signal line.

(Flushing Valves)

A flushing valve 31 is connected to the lines 21 and 22 and a tank 33. The flushing valve 31 is switched so as to communicate between the line with a lower pressure, of the line 21 and the line 22, and the tank 33. A flushing valve 32 is connected to the lines 24 and 25 and the tank 33. The flushing valve 32 also is switched so as to communicate between the line with a lower pressure, of the line 24 and the line 25, and the tank 33.

(Check Valves, Relief Valves)

A check valve 34*a* is provided so as to connect the tank 33 to each of the lines 21 and 22. When the pressures in the lines 21 and 22 are lowered below the pressure in the tank 33, a hydraulic operating oil is supplied from the tank 33 to the lines 21 and 22. A check valve 34*b* is provided so as to connect the tank 33 to each of the lines 24 and 25. When the pressures in the lines 24 and 25 are lowered below the pressure in the tank 33, a hydraulic operating oil is supplied from the tank 33 to the lines 24 and 25.

Relief valves 37*a* and 37*b* are each provided so as to connect the tank 33 to each of the lines 21 and 22. The relief valves 37*a*, 37*b*, 38*a*, and 38*b* are opened when the pressures in the lines 21, 22, 24, and 25 exceed a preset pressure, and play the role of safety valves for discharging the hydraulic operating oil to the tank 33.

(Pump Valve Controller)

The pump valve controller 40 is connected to a boom lever 30*a* and a swing lever 30*b* as operating levers 30 by signal lines, and is connected to the selector valves 23 and 26 and the regulators 11*a* and 12*a* of the closed circuit pumps 11 and 12 by control signal lines. The pump valve controller 40 determines delivery rates of the closed circuit pumps 11 and 12 based on operation amounts of the boom lever 30*a* and the swing lever 30*b*, and outputs control signals according to the delivery rates to the regulators 11*a* and 12*a*. In addition, when it is detected that the boom lever 30*a* and/or the swing lever 30*b* is operated, the pump valve controller 40 opens the selector valves 23 and 26 to cause the hydraulic operating oil delivered respectively by the closed circuit pumps 11 and 12 to flow into the boom cylinder 1 and the swing motor 7, thereby controlling the drive of the boom cylinder 1 and the swing motor 7. The delivery directions of the hydraulic operating oil at the closed circuit pumps 11 and 12 are determined respectively by operating directions of the boom lever 30*a* and the swing lever 30*b*. Note that, in the present embodiment, the pump valve controller 40 is described taking a controller including an electric or electronic circuit as an example thereof, the pump valve controller 40 may be configured by a hydraulic circuit.

(Configuration According to Present Invention)

Next, the structure of the flushing valve in the present embodiment will be described.

(Flushing Valve Structure)

Figure 3:
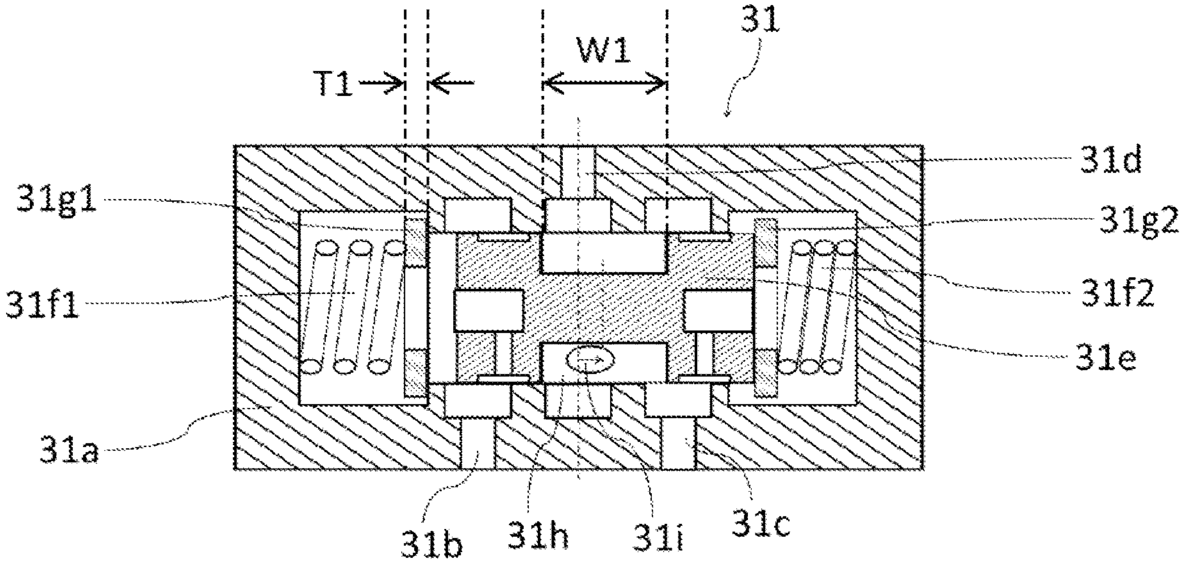
FIG. 3 is a schematic view depicting the inside structure of a flushing valve provided in a cylinder closed circuit according to the first embodiment of the present invention.

FIG. 3 depicts an example of the inside structure of a flushing valve 31 for the cylinder closed circuit C1. Lines 31*b*, 31*c*, and 31*d* are formed in a manifold 31*a*. The lines 21 and 22, and the tank 33 in FIG. 2 are connected respectively to the lines 31*b*, 31*c*, and 31*d*. A spool 31*e* in which a line 31*h* is formed, shims 31*g*1 and 31*g*2 and springs 31*f*1 and 31*f*2 are disposed in the manifold 31*a*. When a hydraulic operating oil is introduced into respective oil chambers where the springs 31*f*1 and 31*f*2 are present from the lines 31*b* and 31*c*, the spool 31*e* is moved either to the left or the right, depending on the magnitude relation between the pressures in the oil chambers. For example, when the pressure in the line 31*b* is higher than that in the line 31*c*, the pressure in the oil chamber where the spring 31*f*1 is present is higher, so that the spool 31*e* is moved to the right. With the spool 31*e* moved to the right by an amount corresponding to a stroke amount 31*i*, a line 32*c* on the lower pressure side is connected to a line 32*d* through a line 32*h*.

Figure 4:
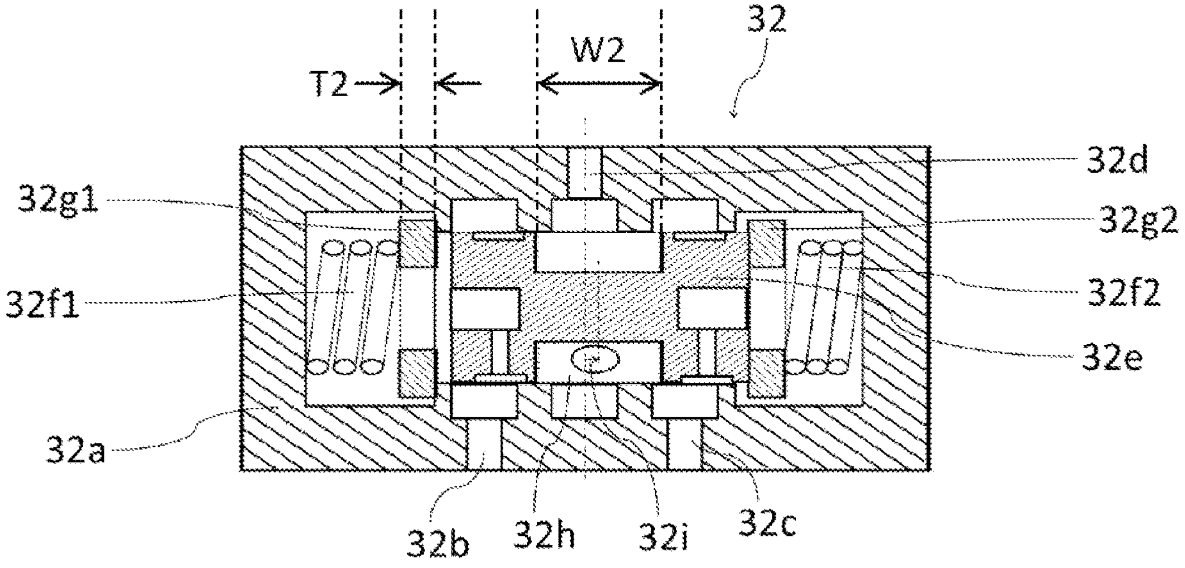
FIG. 4 is a schematic view depicting the inside structure of a flushing valve provided in a swing closed circuit according to the first embodiment of the present invention.

FIG. 4 depicts an example of the inside structure of a flushing valve 32 for the swing closed circuit C2. Lines 32*b*, 32*c*, and 32*d* are formed in a manifold 32*a*. The lines 24 and 25 and the tank 33 in FIG. 2 are connected respectively to the lines 32*b*, 32*c*, and 32*d*. A spool 32*e* in which a line 32*h* is formed, shims 32*g*1 and 32*g*2, and springs 32*f*1 and 32*f*2 are disposed in the manifold 32*a*. The flushing valve 32 operates similarly to the flushing valve 31 in FIG. 3. In FIG. 4, a moving amount from a neutral position of the spool 32*e* is a stroke amount 32*i*.

Here, in the flushing valve 32 for the swing closed circuit C2 in FIG. 4, for making the throttle narrower than that in the flushing valve 31 (depicted in FIG. 3) for the cylinder closed circuit C1, a thickness T2 of the shims 32*g*1 and 32*g*2 is set larger than a thickness T1 of the shims 31*g*1 and 31*g*2. As a result, the stroke amount 32*i* of the spool 32*e* when a differential pressure is generated between the line 32*b* and the line 32*c* in FIG. 4 is smaller than the stroke amount 31*i* in FIG. 3, and, therefore, the maximum opening area between the line 32*b* or the line 32*c* and the line 32*h* is reduced.

(Conventional Swing Operation)

Next, an operation when the swing motor 7 is driven by a conventional hydraulic driving device will be described using FIG. 2. Here, the conventional hydraulic driving device is the hydraulic driving device 105 depicted in FIG. 2, in which the structure of the flushing valve 32 for the swing closed circuit C2 is made to be the same as that of the flushing valve 31 (depicted in FIG. 3) for the cylinder closed circuit C1.

(Stop—Lever Input—Swing Acceleration)

When an operator operates the swing lever 30*b* from neutral to a predetermined operation amount to thereby give an input for instructing rotational drive of the swing motor 7, the pump valve controller 40 receives the operation amount of the swing lever 30*b* through a signal line. Based on the operation amount of the swing lever 30*b* thus received, the pump valve controller 40 sets a control command value for the selector valve 26 to an open state, for connecting the closed circuit pump 12 to the swing motor 7. In addition, the pump valve controller 40 sets a pump delivery rate command value for the closed circuit pump 12 to a value corresponding to the operation amount of the swing lever 30*b*. The pump valve controller 40 outputs the control command value and the pump delivery rate command value to the selector valve 26 and the regulator 12*a* of the closed circuit pump 12 through control signal lines.

As a result, the selector valve 26 is opened, the hydraulic operating oil delivered by the closed circuit pump 12 flows into the input-output port 7*a* of the swing motor 7 through the selector valve 26 and the line 24, to drive the swing motor 7. The hydraulic operating oil flowing out of the input-output port 7*b* is sucked into the closed circuit pump 12 through the line 25 and the selector valve 26.

At this time, the hydraulic operating oil delivered by the closed circuit pump 12 accelerates the inertial body of the upper swing structure 102 (depicted in FIG. 1) connected to the swing motor 7, and, therefore, the pressure in the line 24 which is on the hydraulic operating oil delivery side of the closed circuit pump 12 becomes higher than the pressure in the line 25. The flushing valve 32 is switched over so as to connect the line 25 on the low pressure side to the tank 33.

(During Swing—Lever Neutral—Swing Deceleration)

When the operator operates the swing lever 30*b* from a predetermined operation amount to a neutral position to give an input for instructing stoppage of the swing motor 7, the pump valve controller 40 receives the operation amount of the swing lever 30*b* through a signal line. Based on the operation amount of the swing lever 30*b* thus received, the pump valve controller 40 sets a control command value for the selector valve 26 to a closed state for connecting the closed circuit pump 12 to the swing motor 7. In addition, the pump valve controller 40 sets a pump delivery rate command value for the closed circuit pump 12 to a value according to the operation amount of the swing lever 30*b*. When the swing lever 30*b* is neutral, the pump delivery rate command value is 0. The pump valve controller 40 outputs the control command value and the pump delivery rate command value to the selector valve 26 and the regulator 12*a* of the closed circuit pump 12 through control signal lines.

As a result, the selector valve 26 is closed, and the closed circuit pump 12 stops delivery of the hydraulic operating oil, but since the swing motor 7 continues rotating by inertial force of the upper swing structure 102 (depicted in FIG. 1) connected to the swing motor 7, the swing motor 7 delivers the hydraulic operating oil from the input-output port 7*b* into the line 25. In this instance, the flushing valve 32 keeps a switching position at the time of starting swing, and, therefore, is connecting the line 25 to the tank 33. Accordingly, the hydraulic operating oil flowing out of the input-output port 7*b* is discharged to the tank 33 through the line 25 and the flushing valve 32.

The state inside the swing closed circuit C2 at this time will be described using FIG. 5. When the operator operates the swing lever 30*b* from a predetermined operation amount to a neutral position, the flow rate of the hydraulic operating oil flowing to the flushing valve 32 increases accordingly. When the through flow rate of the flushing valve 32 increases, the pressure inside the line 25 rises due to pressure loss. On the other hand, the pressure inside the line 24 is lowered, since the input-output port 7*a* of the swing motor 7 sucks in the hydraulic operating oil in the line 24. When the pressure inside the line 24 is lowered below the pressure inside the line 25, the flushing valve 32 is switched over, to connect the line 24 to the tank 33. Thereafter, the hydraulic operating oil flowing out from the input-output port 7*b* of the swing motor 7 flows in the line 25, and the pressure inside the line 25 is further raised. When the pressure inside the line 25 is raised to a preset pressure of the relief valve 38*b* (hereinafter referred to as relief pressure), the relief valve 38*b* is opened, and the hydraulic operating oil is discharged to the tank 33. When the pressure inside the line 25 exceeds the pressure inside the line 24 to reach the relief pressure, the rotational speed of the swing motor 7 is decelerated, and the swing motor 7 is stopped after a predetermined time.

(Case of Flushing Valve of Present Invention)

Next, an operation when the swing motor 7 is driven by the hydraulic driving device 105 in the present embodiment will be described using FIG. 2.

(Stop—Lever Neutral—Swing Acceleration)

The behavior of the swing motor 7 when the operator operates the swing lever 30*b* from neutral to a predetermined operation amount is similar to the aforementioned, and the description thereof is omitted.

(During Swing-Lever Neutral-Swing Deceleration)

When the operator operates the swing lever 30*b* from a predetermined operation amount to a neutral position to give an input for instructing stoppage of the swing motor 7, the pump valve controller 40 receives the operation amount of the swing lever 30*b* through a signal line. Based on the operation amount of the swing lever 30*b* thus received, the pump valve controller 40 sets a control command value for the selector valve 26 to a closed state for connecting the closed circuit pump 12 to the swing motor 7. In addition, the pump valve controller 40 sets a pump delivery rate command value for the closed circuit pump 12 to a value corresponding to the operation amount of the swing lever 30*b*. When the swing lever 30*b* is neutral, the pump delivery rate command value is 0. The pump valve controller 40 outputs the control command value and the pump delivery rate command value to the selector valve 26 and the regulator 12*a* of the closed circuit pump 12 through control signal lines.

As a result, the selector valve 26 is closed, and the closed circuit pump 12 stops delivery of the hydraulic operating oil, but since the swing motor 7 continues rotating by inertial force possessed by the inertial body of the upper swing structure 102 (depicted in FIG. 1) connected to the swing motor 7, the swing motor 7 delivers the hydraulic operating oil from the input-output port 7*b* to the line 25. At this time, the flushing valve 32 keeps a switching position at the time of starting swing, and therefore, connects the line 25 to the tank 33. Therefore, the hydraulic operating oil flowing out of the input-output port 7*b* is discharged to the tank 33 through the line 25 and the flushing valve 32.

Next, the state inside the swing closed circuit C2 will be described using FIG. 6. When the operator operates the swing lever 30*b* from a predetermined operation amount to a neutral position, the through flow rate of the flushing valve 32 increases accordingly.

The structure of the flushing valve 32 depicted in FIG. 4 is smaller in stroke amount 32*i* and narrower in throttle as compared to the aforementioned structure in FIG. 3, and therefore, a rise in the pressure inside the line 25 due to pressure loss is quicker as compared to the increase in the through flow rate of the flushing valve 32. As a result, the flushing valve 32 is switched over more quickly in response to an operation of the swing lever 30*b*, as compared to the case to which the structure of FIG. 3 is applied.

Figure 6:
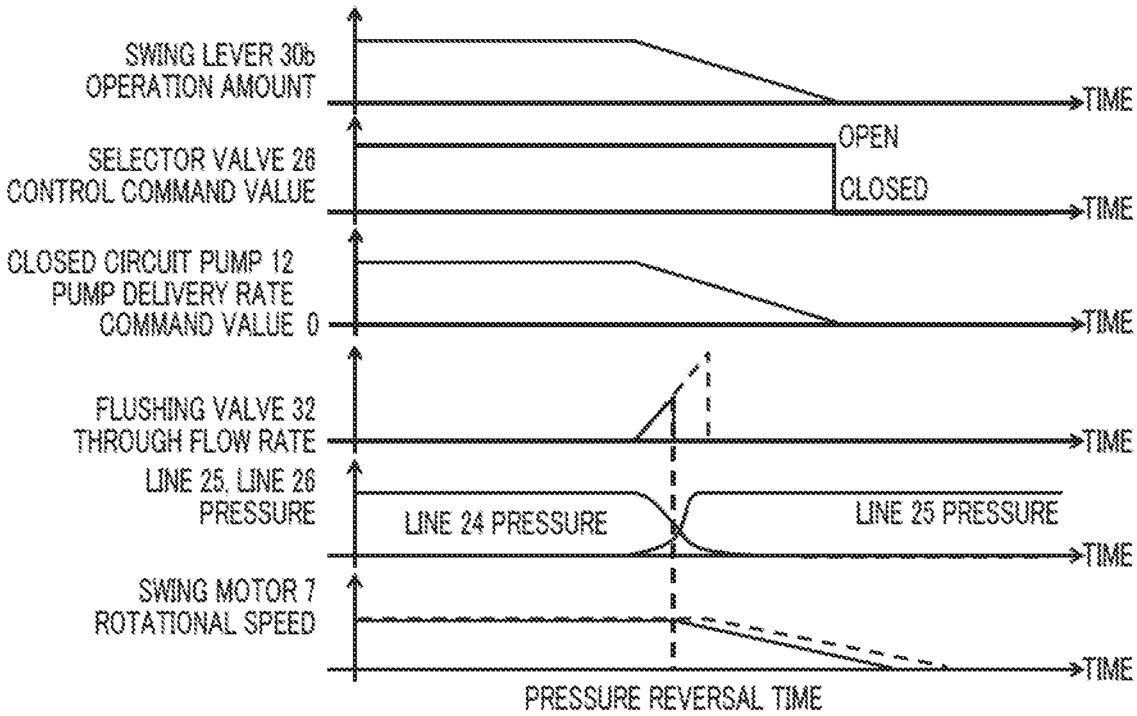
FIG. 6 is a diagram depicting an example of operation of the swing closed circuit according to the first embodiment of the present invention.

Thereafter, as depicted in FIG. 6, when the pressure inside the line 25 exceeds the pressure inside the line 24 to reach the relief pressure, the rotational speed of the swing motor 7 is decelerated, and the swing motor 7 is stopped after a predetermined time.

Effect of Invention

Figure 5:
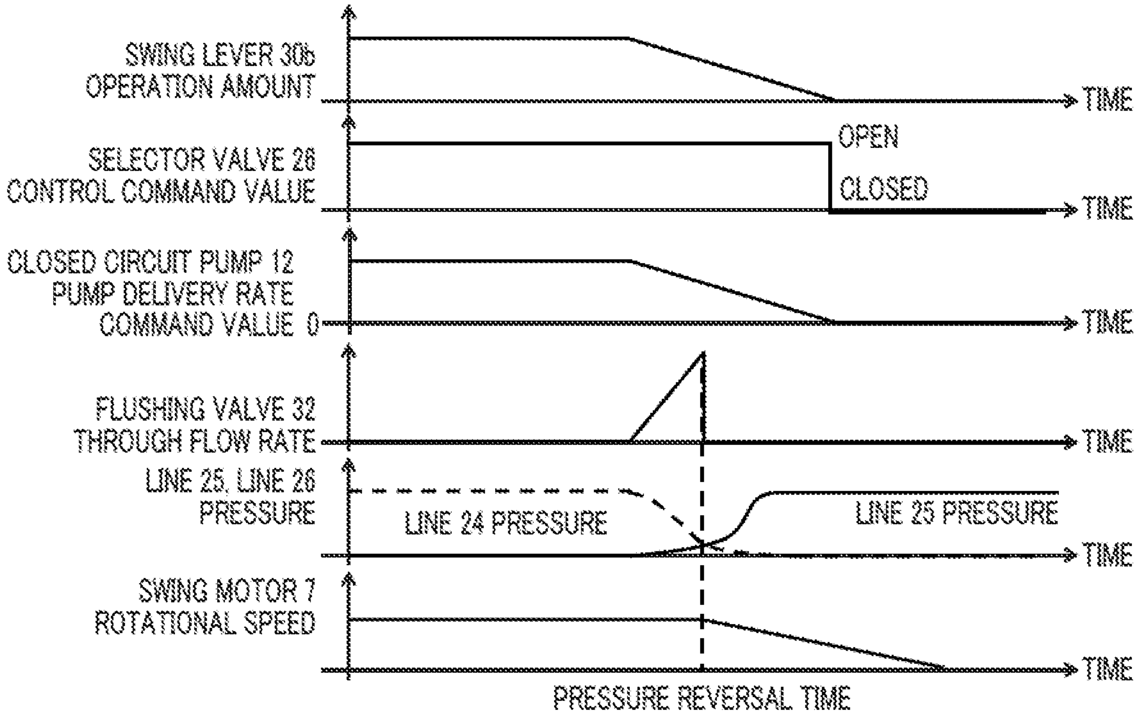
FIG. 5 is a diagram depicting an example of operation of a conventional swing closed circuit.

Since the structure of the flushing valve 32 depicted in FIG. 4 is narrower in throttle than the structure of FIG. 3 applied to the aforementioned flushing valve 31, the rise in pressure inside the line 25 in response to the through flow rate of the flushing valve 32 depicted in FIG. 6 becomes larger as compared to the conventional example depicted in FIG. 5. As a result, in response to an operation of returning the swing lever 30*b* to the neutral position, the timing of the rise in the pressure inside the line 25 is earlier than in the conventional example (depicted in FIG. 5), and the start of deceleration of the swing motor 7 is also earlier. In other words, the present invention enables deceleration responsiveness of the swing motor 7 to be enhanced.

In the hydraulic excavator 100, deceleration and stopping performance is important for the swing operation of the upper swing structure 102. For example, when excavated soil is loaded on a vehicle such as a dump truck, it is necessary for the hydraulic excavator 100 to swing, after excavation, and carry the soil above the dump truck without dropping the soil; at this time, if swing deceleration response, or brake response is poor, the swing cannot be stopped above the dump truck, and the swing may pass the stop position above the dump truck, thereby lowering the work efficiency.

When the brake responsiveness in swing of the swing closed circuit is enhanced by the present invention, the swing can be easily stopped above the dump truck, and work efficiency is improved.

In the first embodiment of the present invention, the construction machine 100 includes: the lower track structure 103; the upper swing structure 102 swingably mounted to the lower track structure 103; the work device 104 provided on the upper swing structure 102; the tank 33 reserving the hydraulic operating oil; the single rod-type hydraulic cylinder 1 that drives the work device 104; the swing hydraulic motor 7 that drives the upper swing structure 102; the operating device 30 that instructs operations of the work device 104 and the upper swing structure 102; the first closed circuit pump 11 including a bidirectionally tiltable pump; the second closed circuit pump 12 including a bidirectionally tiltable pump; the cylinder closed circuit C1 that connects the first closed circuit pump 11 to the single rod-type hydraulic cylinder 1 in a state of a closed circuit; the swing closed circuit C2 that connects the second closed circuit pump 12 to the swing hydraulic motor 7 in a state of a closed circuit; the first flushing valve 31 that permits the line on the low pressure side of the cylinder closed circuit C1 to communicate with the tank 33; the second flushing valve 32 that permits the line on the low pressure side of the swing closed circuit C2 to communicate with the tank 33; the first selector valve 23 that switches between communication and interruption of communication between the first closed circuit pump 11 and the single rod-type hydraulic cylinder 1; and the second selector valve 26 that switches between communication and interruption of communication between the second closed circuit pump 12 and the swing hydraulic motor 7. The openings and closings of the first selector valve 23 and the second selector valve 26 and the delivery rates of the first closed circuit pump 11 and the second closed circuit pump 12 are controlled according to operation signals inputted from the operating device 30, and in the construction machine 100, the minimum passage area from the second flushing valve 32 to the tank 33 when the second flushing valve 32 is fully open is smaller than the minimum passage area from the first flushing valve 31 to the tank 33 when the first flushing valve 31 is fully open.

According to the present embodiment configured as above, at the time of starting swing deceleration, when the hydraulic operating oil is discharged from the pump suction side to the tank through the flushing valve (second flushing valve) 32 for the swing closed circuit C2, a large pressure loss is generated in the second flushing valve 32, whereby the pressure inside the line on the pump suction side is swiftly raised, and the second flushing valve 32 is swiftly switched over. As a result, the time necessary for the pressure inside the line on the pump suction side to reach the relief pressure is shortened, and, therefore, swing deceleration responsiveness is enhanced, and a good swing operability is obtained.

In addition, the first flushing valve 31 includes: the first manifold 31*a*; the first spool 31*e* disposed inside the first manifold 31*a*; the first springs 31*f*1 and 31*f*2 that are disposed inside the first manifold 31*a* and that bias the first spool 31*e*; and the first shims 31*g*1 and 31*g*2 disposed between the first spool 31*e* and each of the first springs 31*f*1 and 31*f*2, the second flushing valve 32 includes: the second manifold 32*a*; the second spool 32*e* disposed inside the second manifold 32*a*; the second springs 32*f*1 and 32*f*2 that are disposed inside the second manifold 32*a* and that bias the second spool 32*e*; and the second shims 32*g*1 and 32*g*2 disposed between the second spool 32*e* and each of the second springs 32*f*1 and 32*f*2, and the thickness T2 of each of the second shims 32*g*1 and 32*g*2 in a spool axial direction is larger than the thickness T1 of each of the first shims 31*g*1 and 31*g*2. As a result, the maximum opening area of the flushing valve 32 can be reduced without changing the shape of the manifold 32*a* which is cast in a die, and, therefore, cost of the flushing valve 32 can be suppressed.

Second Embodiment

Figure 7:
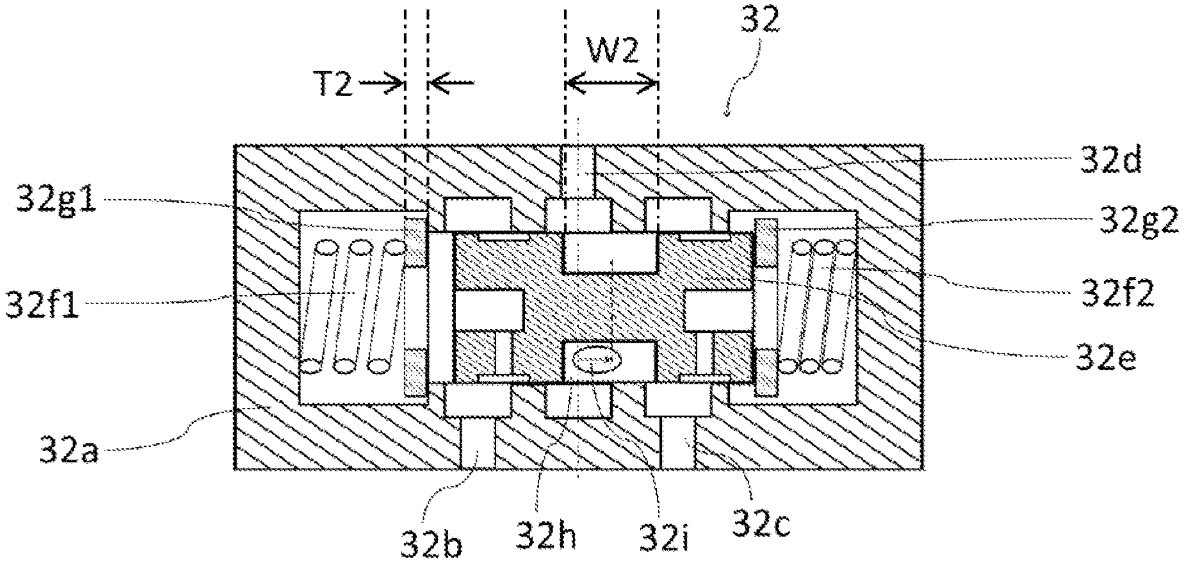
FIG. 7 is a schematic view depicting the inside structure of a flushing valve provided in a swing closed circuit according to a second embodiment of the present invention.

FIG. 7 depicts the inside structure of a flushing valve 32 for a swing closed circuit C2 according to a second embodiment of the present invention.

In FIG. 7, the difference from the flushing valve 32 (depicted in FIG. 4) for the swing closed circuit C2 according to the first embodiment is that the thickness T2 of each of the shims 32*g*1 and 32*g*2 is equal to the thickness T1 of each of the shims 31*g*1 and 31*g*2 of the flushing valve 31 (depicted in FIG. 2) for the cylinder closed circuit C1 and that a width W2 of the line 32*h* in the spool axial direction, the line 32*h* being formed in the spool 32*e*, is smaller than a width W1 of the line 31*h* of the flushing valve 31.

In this way, in the present embodiment, the first flushing valve 31 has the first manifold 31*a* and the first spool 31*e* disposed inside the first manifold 31*a*, the second flushing valve 32 has the second manifold 32*a* and the second spool 32*e* disposed inside the second manifold 32*a*; the first tank connection line 31*h* for causing the line on the low pressure side of the cylinder closed circuit C1 to communicate with the tank 33 is formed at an intermediate portion of the first spool 31*e*, the second tank connection line 32*h* for causing the line on the low pressure side of the swing closed circuit C2 to communicate with the tank 33 is formed at an intermediate portion of the second spool 32*e*; and the width W2 of the second tank connection line 32*h* in the spool axial direction is smaller than the width W1 of the first tank connection line 31*h* in the spool axial direction.

Also, in the present embodiment configured as above, also, the minimum passage area from the flushing valve 32 to the tank 33 when the flushing valve 32 is fully open is smaller than the minimum passage area from the flushing valve 31 to the tank 33 when the flushing valve 31 is fully open, and, therefore, like in the first embodiment, swing deceleration responsiveness is enhanced, and a good swing operability is obtained.

Third Embodiment

Figure 8:
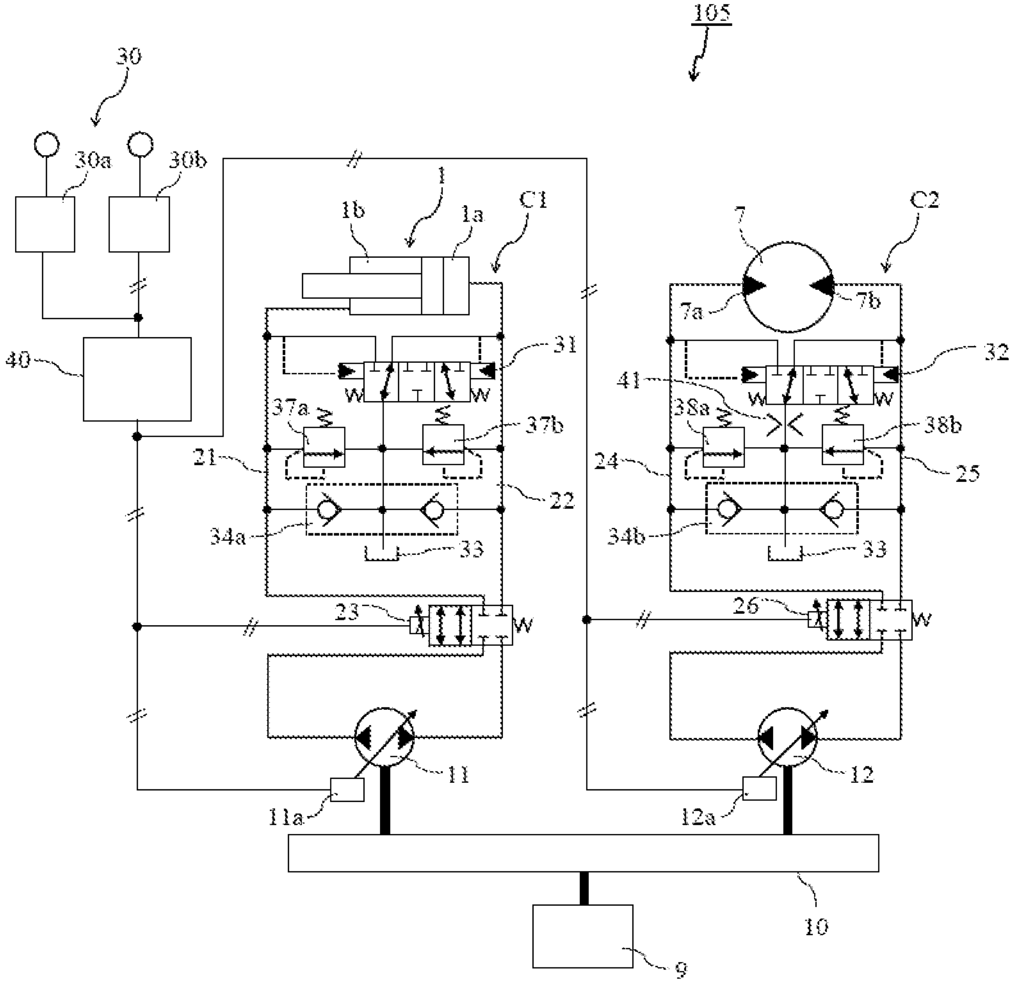
FIG. 8 is a hydraulic circuit diagram depicting a hydraulic driving device according to a third embodiment of the present invention.

FIG. 8 depicts a hydraulic driving device 105 according to a third embodiment of the present invention.

In FIG. 8, the difference from the first embodiment (depicted in FIG. 2) is that the structure of the flushing valve 32 for the swing closed circuit C2 is the same as that of the flushing valve 31 (depicted in FIG. 3) for the cylinder closed circuit C1, and a throttle 41 is provided on a line for connecting the flushing valve 31 to the tank 33. Here, the opening area of the throttle 41 is substantially on the order of the maximum opening area between the line 32*b* or the line 32*c* and the line 32*h* in the flushing valve 32 (depicted in FIG. 4) for the swing closed circuit C2 according to the first embodiment. As a result, the minimum passage area from the flushing valve 32 to the tank 33 when the flushing valve 32 is fully open is smaller than the minimum passage area from the flushing valve 31 to the tank 33 when the flushing valve 31 is fully open, like in the first embodiment.

In this way, the hydraulic excavator 100 according to the present embodiment further includes the throttle 41 provided on the line for connecting the second flushing valve 32 to the tank 33, and the second flushing valve 32 has the same structure as that of the first flushing valve 31.

Also, in the present embodiment configured as above, the minimum passage area from the flushing valve 32 to the tank 33 when the flushing valve 32 is fully open is smaller than the minimum passage area from the flushing valve 31 to the tank 33 when the flushing valve 31 is fully open, and therefore, swing deceleration responsiveness is enhanced, and a good swing operability is obtained, like in the first embodiment Further, the flushing valve (second flushing valve 32) for the swing closed circuit C2 is the same in specifications as the flushing valve (first flushing valve 31) for the cylinder closed circuit C1, and therefore, cost can be reduced.

While the embodiments of the present invention have been described in detail above, the present invention is not limited to the above embodiments, but includes various modifications. For example, the above-described embodiments are described in detail for easily understandably explaining the present invention, and are not necessarily limited to those including all the configurations described. Further, it is possible to add a part of the configuration of other embodiment to the configuration of a certain embodiment, and a part of the configuration of a certain embodiment may be deleted or may be replaced by a part of other embodiment.

DESCRIPTION OF REFERENCE CHARACTERS

1: Boom cylinder (single rod-type hydraulic cylinder)
1*a*: Boom head
1*b*: Boom rod
2: Boom
3: Arm cylinder
3*a*: Arm head
3*b*: Arm rod
4: Arm
5: Bucket cylinder
5*a*: Bucket head
5*b*: Bucket rod
6: Bucket
7: Swing motor (swing hydraulic motor)
7*a*, 7*b*: Input-output port
8*a*, 8*b*: Track device
9: Engine
10: Transmission device
11: Closed circuit pump (first closed circuit pump)
12: Closed circuit pump (second closed circuit pump)
11*a*, 12*a*: Regulator
21, 22, 24, 25: Line
23: Selector valve (first selector valve)
26: Selector valve (second selector valve)
30: Operating lever (operating device)
30*a*: Boom lever
30*b*: Swing lever
31: Flushing valve (first flushing valve)
32: Flushing valve (second flushing valve)
31*b*, 31*c*, 31*d*: Line
31*e*: Spool (first spool)
31g1, 31*g*2: Shim (first shim)
31*f*1, 31*f*2: Spring (first spring)
31*h*: Line (first tank connection line)
31*i*: Stroke amount
32*b*, 32*c*, 32*d*: Line
32*e*: Spool (second spool)
32*g*1, 32*g*2: Shim (second shim)
32*f*1, 32*f*2: Spring (second spring)
32*h*: Line (second tank connection line)
32*i*: Stroke amount
33: Tank
34*a*, 34*b*: Check valve
37*a*, 37*b*, 38*a*, 38*b*: Relief valve
40: Pump valve controller
100: Hydraulic excavator (construction machine)
101: Cab
102: Upper swing structure
104: Front work implement (work device)
105: Hydraulic driving device

The invention claimed is:

1. A construction machine comprising:

a lower track structure;

an upper swing structure swingably mounted to the lower track structure;

a work device provided on the upper swing structure;

a tank reserving a hydraulic operating oil;

a single rod-type hydraulic cylinder that drives the work device;

a swing hydraulic motor that drives the upper swing structure;

an operating device that gives instructions on operations of the work device and the upper swing structure;

a first closed circuit pump including a bidirectionally tiltable pump;

a second closed circuit pump including a bidirectionally tiltable pump;

a cylinder closed circuit that connects the first closed circuit pump to the single rod-type hydraulic cylinder in a state of a closed circuit;

a swing closed circuit that connects the second closed circuit pump to the swing hydraulic motor in a state of a closed circuit;

a first flushing valve that permits a line on a low pressure side of the cylinder closed circuit to communicate with the tank;

a second flushing valve that permits a line on a low pressure side of the swing closed circuit to communicate with the tank;

a first selector valve that switches between communication and interruption of communication between the first closed circuit pump and the single rod-type hydraulic cylinder; and a second selector valve that switches between communication and interruption of communication between the second closed circuit pump and the swing hydraulic motor, and openings and closings of the first selector valve and the second selector valve and delivery rates of the first closed circuit pump and the second closed circuit pump being controlled according to operation signals inputted from the operating device, wherein a minimum passage area from the second flushing valve to the tank in a case the second flushing valve is fully open is smaller than a minimum passage area from the first flushing valve to the tank in a case the first flushing valve is fully open.

2. The construction machine according to claim 1, wherein the first flushing valve has a first manifold, a first spool disposed in the first manifold, a first spring that is disposed in the first manifold and that biases the first spool, and a first shim disposed between the first spool and the first spring, the second flushing valve has a second manifold, a second spool disposed in the second manifold, a second spring that is disposed in the second manifold and that biases the second spool, and a second shim disposed between the second spool and the second spring, and a thickness of the second shim in a spool axial direction is larger than a thickness of the first shim in a spool axial direction.

3. The construction machine according to claim 1, wherein the first flushing valve has a first manifold, and a first spool disposed in the first manifold, the second flushing valve has a second manifold, and a second spool disposed in the second manifold, a first tank connection line for permitting a line on a low pressure side of the cylinder closed circuit to communicate with the tank is formed at an intermediate portion of the first spool, a second tank connection line for permitting a line on a low pressure side of the swing closed circuit to communicate with the tank is formed at an intermediate portion of the second spool, and a width of the second tank connection line in a spool axial direction is smaller than a width of the first tank connection line in a spool axial direction.

4. The construction machine according to claim 1, further comprising:

a throttle provided on a line connecting the second flushing valve to the tank, wherein the second flushing valve has a same structure as that of the first flushing valve.

* * * * *